Patented Feb. 12, 1946

2,394,616

UNITED STATES PATENT OFFICE 2,394,616

SURFACE COATING FOR PACKAGING POLYMERS

Fred Knoth, Jr., Linden, and Michael A. Pavlick, Elizabeth, N. J., assignors to Standard Oil Development Company, a corporation of Delaware No Drawing. Application December 9, 1942, Serial No. 468,426

1 Claim. (Cl. 260—23)

This invention relates to suitable containers for the storage and shipping of synthetic, high molecular weight, essentially hydrocarbon polymer materials, which are somewhat tacky in nature and undergo cold-flow; and to the manner of preparing same. It relates particularly to the surface treatment of suitably rigid packaging equipment for overcoming loss and contamination of the synthetic materials as a result of adherence to the inner surfaces of container equipment.

The present cost and commercial importance of synthetic rubber and similar type essentially hydrocarbon polymers demand packaging facilities for storage and shipping which do not involve substantial loss or contamination of the essential material due to adhesion of the materials to the containers. The use of metallic or wooden containers is excluded on the commercial scale on account of weight and the conveniences of packaging in strong paper, cardboard, strawboard, fibrous compositions or the like. Convenient sized packages of polymeric materials in such type containers are easily and inexpensively made and are satisfactorily sturdy for all handling purposes and easily opened without the employment of special tools. Moreover, it has now been found that the containers themselves can be very easily coated with compositions to prevent substantial loss of the essential material due to their relatively tacky nature and their tendencies to undergo relatively persistent deformation or cold-flow when the materials are subjected to an applied stress at ordinary temperatures. Some of the compositions do not markedly affect disadvantageously the bulk of the polymeric material and may therefore be milled into the mass. It is to the preparation and use of such compositions particularly advantageous in use, that the present invention relates.

The coating composition of the present invention is an aqueous emulsion. The composition is thus normally applied at atmospheric temperatures to the inner surfaces of the containers by spraying, brushing, rolling or dipping and then allowed to dry. When dry the surface of the container is coated with a superficial layer. This layer permits easy removal of the polymeric material from the container. Any of the coating composition adhering to the surfaces of the polymeric material may be readily removed by wiping, scraping or brushing the surfaces or, in some cases, as the dried coating composition is itself largely of a hydrocarbon polymeric nature, may be milled into the mass. The milling into the mass of any adhering coating composition is almost entirely without effect upon the mass when the polymeric material of the coating composition is the same as that of the material within the container.

The emulsified composition of this invention is usually prepared by first melting, and preferably heating to about 190° F. a quantity of a petroleum wax and then mixing therewith about one-quarter of its weight of a high molecular weight essentially hydrocarbon polymeric material. To the mixture a relatively small quantity of a wetting agent is added and sufficient water then added to form a crude emulsion of fairly viscous consistency. Then a smooth, finely divided inert material such as highly pulverized clay or talc powder is added to the mixture alternately with water and the mass finely emulsified, such as by passing the mixture through a colloid mill. A very desirable emulsion is formed by using a finely divided clay such as that commonly known as Dixie clay.

The class of hydrocarbon polymers which are particularly suitable for the preparation of an inner lining for shipping containers in accordance with the present invention are the solid substantially saturated long chain linear isobutylene polymers produced by the polymerization of isobutylene alone or admixed with an inert diluent, in the presence of a Friedel-Crafts type catalyst or boron fluoride dissolved in an alkyl halide at a temperature ranging from —50° to —80° and as low as —150° C. Polymerized isobutylene having a molecular weight of 20,000 or above is for example, sufficiently solid and rubber-like to permit its being used in many instances as a constituent of the compositions for lining shipping containers. Similarly interpolymers of an isoolefin and a diolefin as prepared in accordance with the steps as taught in Australian Patent 112,875 issued to R. M. Thomas and W. J. Sparks are effectively utilized for the purpose of the present invention.

The surface active materials employed in the preparation of the emulsified compositions include such substances as Kieselguhr, infusorial earth, magnesium silicate, zinc stearate, whiting, magnesium carbonate, Kalite, lithopone, titanium pigment, French chalk, zinc oxide, zinc sulfide, "Celite" (diatomaceous earth material of siliceous origin), clays, talc, and the various types of carbon black. These inert finely divided materials admixed with the polymeric material function to control and reduce the cohesive tendency of the material to be packaged from adhering to the container.

The wetting agents commonly employed are those largely of petroleum origin, namely sulphonate or naphthenate soaps, either with or without association of other surface active compounds.

The nature and relative proportions of the various ingredients are determined largely by the type of material with which the containing vessel is to be filled. In all cases however the final emulsion usually contains about 50 parts by weight of substantially solid materials. Also, usually the amount of the smooth, siliceous material is slightly greater than or equal to the combined amounts of the petroleum wax and the hydrocarbon polymeric material. The emulsifying agent is added merely in sufficient quantity to form a substantially stable emulsion.

The coating formed on the inside of the container vessel as a result of spraying, brushing, dipping or rolling the emulsion thereover and allowing to dry, is smooth and very flexible. Furthermore, the coating thus formed is advantageous when present in very thin film formation. The coating film when Dixie clay is employed may be easily brushed or scraped from the surface and such quantities as remain are not disadvantageous when milled into the mass prior to industrial utilization.

The suitability of various coating compositions prepared according to the invention for use in the lining of shipping containers for tacky hydrocarbon polymeric materials is indicated by the following tests:

"Sandwich" test

In this test sheets of the hydrocarbon polymer are placed between cardboard surfaces 4" x 4" treated with the particular coating emulsion. The temperature of the polymeric material at the time of contact with the treated cardboard is about 130° F. The "sandwich" of the hydrocarbon polymer between the layers of treated cardboard is then loaded with a weight equivalent to 0.4 lb. per square inch and is stored for periods, usually for 100 hours, at between about 100° F. and 120° F. The various specimens are then removed and examined for adhesion of the hydrocarbon polymer to the cardboard.

Box test

Another manner of testing the suitability of the various compositions for satisfactorily lining shipping containers is the coating of small cardboard boxes 8" x 8" x 6" filled with the hydrocarbon polymeric material and then loading to simulate large box pressure. The boxes are then stored under such conditions for about a month at a temperature of between 110° F. and 120° F.

An illustration of an emulsion prepared according to the invention is as follows:

| | Parts by weight |
|---|---|
| Low temperature copolymer of isobutylene and butadiene | 10 |
| Petroleum wax, 135° M. P. | 40 |
| Clay (Dixie) | 75 |
| Oleic acid | 5 |
| Triethanolamine | 3 |
| Petroleum sulfonate soap | 3 |
| Water | 150 |

This composition according to "Sandwich" Test with a rubber-like material prepared by low temperature copolymerization of isobutylene and butadiene furnished a coating providing easy separation of the polymeric material, the coating composition being almost entirely on the polymeric material into which it was subsequently milled without any attendant commercial disadvantages.

Another illustrative composition of the invention is as follows:

| | Parts by weight |
|---|---|
| Low temperature copolymer of isobutylene and butadiene | 10 |
| Petroleum wax, 135° M. P. | 40 |
| Clay (Dixie) | 100 |
| Oleic acid | 5 |
| Triethanolamine | 3 |
| Petroleum sulfonate soap | 3 |
| Water | 150 |

This composition when subjected to the Box Test with a low temperature copolymer of isobutylene and butadiene gave an easy separation with most of the coating composition attached to the surface of the polymeric material into which it was subsequently milled without noticeable disadvantageous results.

In the above tables and throughout this specification and appended claims, wherever the term "hydrocarbon polymer" is used, it refers to an isoolefin polymer such as poly-isobutylene or to an interpolymer of an isoolefin with a diolefin or polyolefine such as butadiene, isoprene, piperylene; 2-methyl hexadiene-1,5; myrcene, hexatriene or any other polyolefin or homolog thereof, of 4 to 12 carbon atoms capable of interpolymerization with an isoolefin.

The invention has now been described and illustrated. The invention is however, not thereby limited but is defined by the following claim or its equivalent.

What is claimed is:

An improved liquid coating composition for containers to prevent adherence thereto of tacky, high molecular weight, polymerization products of iso-mono-olefins and poly-olefins, which consists essentially of 10 parts by weight of a low temperature copolymer of isobutylene and butadiene, 40 parts by weight of a petroleum wax of melting point 135° F., 75–100 parts by weight of Dixie clay, 5 parts by weight of oleic acid, 3 parts by weight of triethanolamine, 3 parts by weight of a petroleum sulfonate soap and 150 parts by weight of water compounded together in an emulsion-like mass.

FRED KNOTH, Jr.
MICHAEL A. PAVLICK.